UNITED STATES PATENT OFFICE.

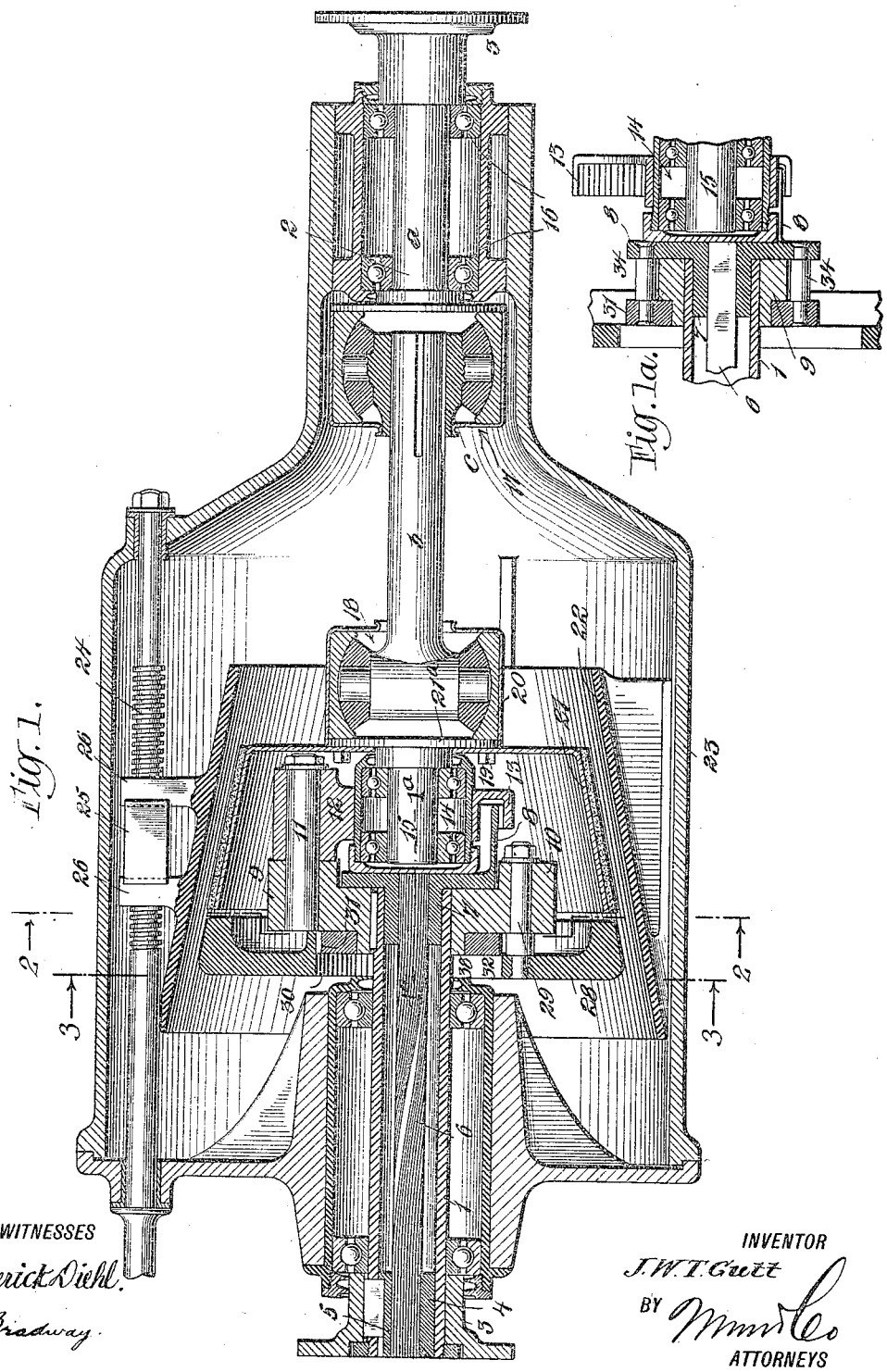

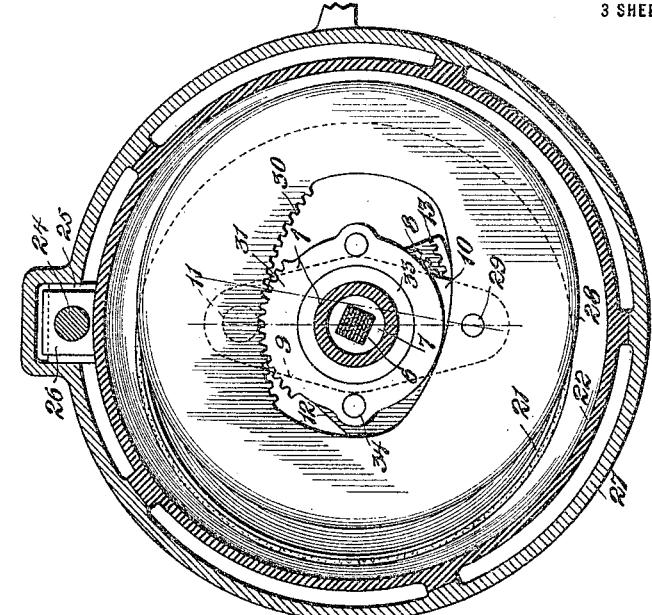
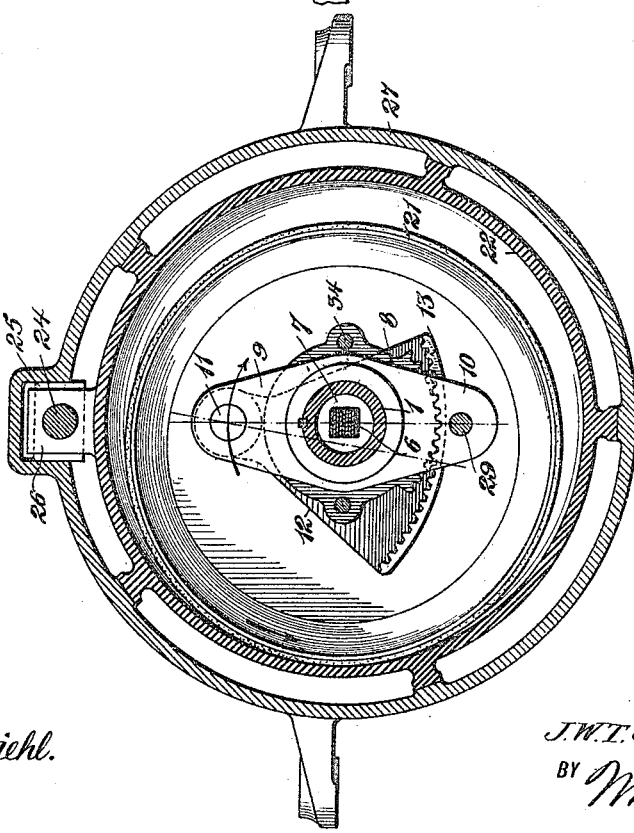

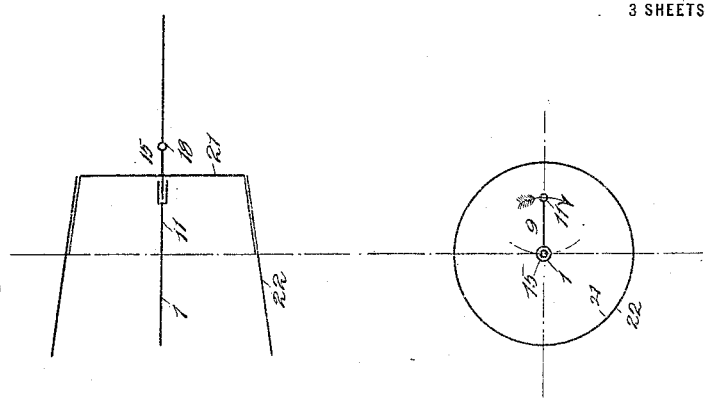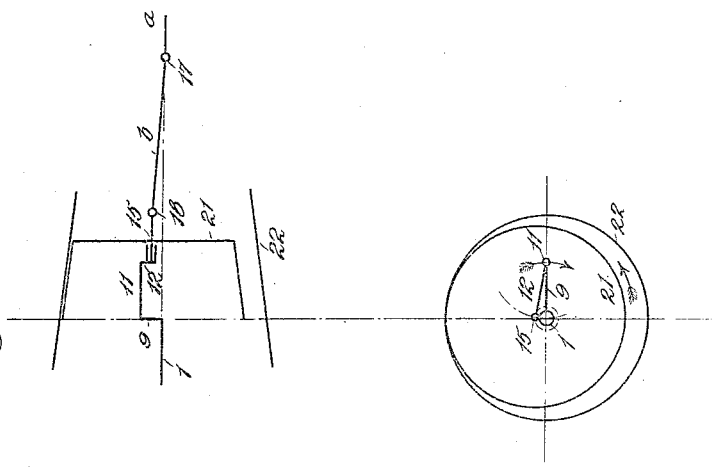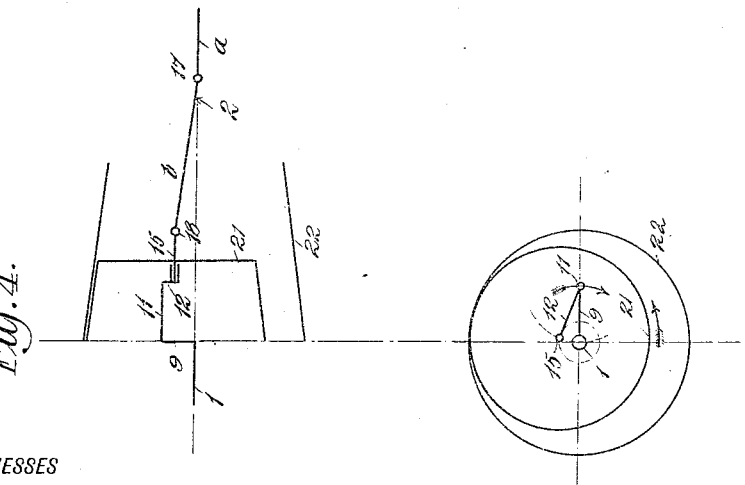

JOHANN W. T. GUTT, OF NEW BRUNSWICK, NEW JERSEY, ASSIGNOR OF ONE-HALF TO GUSTAVE R. HENKE, OF NEW YORK, N. Y.

CHANGE-SPEED DEVICE.

1,223,966.  Specification of Letters Patent.  Patented Apr. 24, 1917.

Application filed May 6, 1916. Serial No. 95,790.

*To all whom it may concern:*

Be it known that I, JOHANN W. T. GUTT, a subject of the German Emperor, and a resident of New Brunswick, in the county of Middlesex and State of New Jersey, have invented a new and Improved Change-Speed Device, of which the following is a full, clear, and exact description.

This invention relates to a change speed device of that type embodying a crank pin connection between the driving and driven shaft, which crank pin can be changed from a concentric to an eccentric position, or vice versa, for the purpose of producing a gradual change in speed or power from zero to maximum, or the reverse, for insuring smooth running, highest efficiency and long life of the mechanism.

The invention has for its general objects to improve and simplify the construction and operation of apparatus of the character referred to so as to be reliable and efficient in use, comparatively simple and inexpensive to manufacture and keep in operative condition, and so designed as to obtain a smooth gradation of speed or power by the operation of a single controller.

A more specific object of the invention is the provision of a novel form of connecting means between the driving and driven shafts for changing the speed ratio, the said connecting means embodying a non-rotatable, axially movable, hollow cone forming a race with which engages a roller that revolves around the axis of the cone and transmits rotation to the driven shaft, and by means of a spring acting through hingedly connected crank arms, the roller is yieldingly maintained in engagement with the conical race to maintain the rolling action, and also to permit the roller to shift in a plane transverse to the axis of rotation by the axial adjustment of the conical race, for the purpose of changing the position of the crank pin of the driven shaft, whereby the speed is changed.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a longitudinal section of a change speed device;

Fig. 1ª is a detail sectional view on the line 1—1, Fig. 1;

Figs. 2 and 3 are respectively transverse sections on the lines 2—2 and 3—3, Fig. 1; and Figs. 4, 5 and 6 are diagrammatic views showing the relative positions of the parts respectively for the highest speed, intermediate speed and no speed.

Referring to the drawings, 1 designates the driving shaft of the change speed device and 2 the driven shaft, each having a suitable coupling 3 for connection with the driving means and the driven means. The shaft 1 is hollow and has keyed therein a plug 4 into the opening 5 of which is fastened a torsional spring 6 made up of strips or laminations of metal. This torsional spring extends through the hollow shaft 1 and has its inner end fastened in the hub 7 of a segmental gear 8. Fastened around the inner end of the shaft 1 is a crank element having oppositely disposed arms 9 and 10, the former of which carries a pin 11 which is parallel with the axis of the driving shaft 1, and on this pin 11 is a crank arm 12 provided with a segmental gear 13 which has internal teeth engaging the external teeth of the segmental gear 8. These teeth are disposed at the side of the axis of the driving shaft opposite from the pin or pintle 11 which hingedly connects the members 9 and 12. In the member 12 is a ball bearing device 14 into which extends a crank pin 15 operatively connected with the driven shaft. The driven shaft is composed of two sections *a* and *b*, the former being journaled in suitable ball bearings 16, and between the sections *a* and *b* is a universal joint 17. This universal joint is of any approved construction, and the shaft section *b* is feathered in the hub *c* of the universal joint, so that the section *b* can have a longitudinal as well as an angular movement with respect to the section *a*. A universal joint 18 is provided between the inner end of the driven shaft section *b* and the crank pin 15, so that the latter can maintain a position with its axis parallel to the axis of the driving shaft, although the crank pin may be eccentric to the latter. Fastened by bolts 19 to the outer section 20 of the universal joint 18 or to the disk 21ª of the crank pin 15 is a frustoconical roller 21 which is free to rotate around its own axis, and in fact this roller, together with the crank pin 15 and the outer section 20 of the universal joint 18, is rigidly connected together and is rotatable as a unit. Surrounding the roller 21 is a frusto-conical hollow race 22 which is non-rotatable but axially adjustable. This race is guided in the casing 23 of the speed change device and it can be axially adjusted in any suitable manner, as, for instance, by a screw 24 journaled in the casing and engaging a nut 25 disposed between lugs 26 on the exterior of the race. The operator rotates the screw in any suitable manner to thereby shift the position of the race 22 with respect to the roller. The roller is maintained in frictional contact with the race by reason of the torsion on the spring 6, this torsion being produced in the initial assembling of the parts, and it remains at all times so that there will be an effective engagement between the roller and race. The roller 21 may have an external covering of leather or equivalent material to increase the frictional hold.

When the roller is at its maximum eccentricity the speed will be highest, and this is brought about by shifting the race 22 to the right as far as it will go, as in the position shown in Fig. 4, and by shifting the race to the left from this position, the roller will move progressively toward a concentric position and thereby bring the crank 15 from the position shown in Fig. 4 to that shown in Fig. 6, whereby the speed will be gradually diminished from maximum to zero. The movement of the race in the opposite direction will increase the speed gradually from zero to maximum.

To insure proper balancing of the parts a counter-balancing weight 28 in the form of a ring is assembled around the driving shaft and it is connected by a pivot pin 29 with the arm 10. On this weight are internal gear teeth 30 which mesh with segmental gear teeth 31 on a ring 32 loosely journaled on the bearing 33 of the double crank element 9 and 10. This ring 32 is connected by pins 34 with the body of the segmental gear 8, so that the movement of the latter will cause a corresponding movement of the ring 32. The point at which the segmental gears 8 and 13 intermesh is diametrically opposite to the points where the segmental gears 30 and 31 mesh, and furthermore the pivot pins 11 and 29 are at diametrically opposite points, and consequently the counterbalancing weight 28 will be shifted in the opposite direction from the other parts of the change speed device when in eccentric relation.

It will be understood that when the driving shaft 1 rotates, the arm 9 and pin 11 rotate with it, and the member 12 on the pin 11 is carried around and it in turn revolves the crank pin 15 of the driven shaft when the crank pin is eccentric to the axis of the driving shaft. The roller 21 has an orbital movement in the race 22. According to the position of the race 22 with respect to the roller 21, the eccentricity of the crank pin 15 and the transmission of power therethrough from the driving shaft to the driven shaft will be determined. The rolling motion of the roller 21 in the race 22 does not serve to transmit power, as the race is merely a means coöperating with the spring 6 to adjust the position of the roller and crank pin 15 with relation to the axis of the driving shaft.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A speed changing device comprising a driving shaft, a driven shaft having an angularly movable section, a crank pin connected with the said section, a roller connected with the said section in concentric relation to the crank pin for rotating the driven shaft, an axially adjustable conical race with the internal surface of which the roller has an engagement, means for operatively connecting the crank pin with the driving shaft, means for yieldingly maintaining the roller in contact with the race, and means for axially adjusting the race.

2. A speed changing device comprising a driving shaft, a driven shaft having an angularly movable section, a crank pin connected with the said section, a roller connected with the said section in concentric relation to the crank pin for rotating the driven shaft, an axially adjustable conical race with the internal surface of which the roller has an engagement, means for operatively connecting the crank pin with the driving shaft, and a spring extending axially of the driving shaft and operatively connected with the roller for yieldingly maintaining the same engaged with the race.

3. The combination of a driving shaft, an arm carried thereby, a member pivotally connected with the arm at a point eccentric to the shaft and adapted to swing on an axis parallel with the shaft, a crank pin operatively connected with the member, spring-actuated means acting on the member to throw the crank pin from a position concentric to the driving shaft, a driven shaft connected with the crank pin to receive rotation therefrom, and an adjustable device for moving the crank pin toward the axis of the driving shaft.

4. A change speed device comprising a driving shaft, a driven shaft in axial alinement therewith and having an angularly movable section, a crank pin on the movable section of the driven shaft, means operatively connecting the crank pin with the driving shaft, means arranged to yieldingly urge the crank pin outwardly from the axis of the driving shaft, and an adjustable device for throwing the crank pin inwardly toward the axis of the driving shaft.

5. A change speed device comprising a driving shaft, a driven shaft in axial alinement therewith and having an angularly movable section, a crank pin on the movable section of the driven shaft, means operatively connecting the crank pin with the driving shaft, a spring means for moving the crank pin eccentrically to the driving shaft, a roller rigidly connected with the crank pin, and a frusto-conical race with the internal surface of which the roller is permanently engaged.

6. A change speed device comprising a hollow driving shaft, a torsional spring therein and anchored at one end, a segmental gear connected with the opposite end of the spring, an arm carried by the shaft, a member pivotally connected with the arm and having a segmental gear meshing with the first-mentioned segmental gear at a point with respect to the axis of the driving shaft opposite from the pivotal connection between the member and arm, a crank pin having a rotatable connection with the member, a driven shaft having a movable section connected with the crank pin whereby the latter can move to and from alinement with the driving shaft, a roller connected with the crank pin in concentric relation thereto, and an axially adjustable conical race with the internal surface of which the roller is maintained in engagement by the said spring through the said segmental gears and member.

7. A change speed device comprising a hollow driving shaft, a torsional spring therein and anchored at one end, a segmental gear connected with the opposite end of the spring, an arm carried by the shaft, a member pivotally connected with the arm and having a segmental gear meshing with the first-mentioned segmental gear at a point with respect to the axis of the driving shaft opposite from pivotal connection between the member and arm, a crank pin having a rotatable connection with the member, a driven shaft having a movable section connected with the crank pin, whereby the latter can move to and from alinement with the driving shaft, a roller connected with the crank pin in concentric relation thereto, an axially adjustable conical race with the internal surface of which the roller is maintained in engagement by the said spring through the said segmental gears and member, and an automatic counterbalancing means connected with the driving shaft for balancing those parts of the device which assume an eccentric position.

8. A change speed device comprising a hollow driving shaft, a torsional spring therein and anchored at one end, a segmental gear connected with the opposite end of the spring, an arm carried by the shaft, a member pivotally connected with the arm and having a segmental gear meshing with the first-mentioned segmental gear at a point with respect to the axis of the driving shaft opposite from the pivotal connection between the member and arm, a crank pin having a rotatable connection with the member, a driven shaft having a movable section connected with the crank pin, whereby the latter can move to and from alinement with the driving shaft, a roller connected with the crank pin in concentric relation thereto, an axially adjustable conical race with the internal surface of which the roller is maintained in engagement by the said spring through the said segmental gears and member, a counterbalancing weight surrounding the driving shaft, and means for changing the relation of the weight to the driving shaft to counterbalance those parts of the change speed device which are capable of assuming an eccentric position.

JOHANN W. T. GUTT.

Copies of this patent may be obtained for five cents each, by addressing the "Commissioner of Patents, Washington, D. C."